United States Patent [19]

Webb

[11] Patent Number: 5,785,858
[45] Date of Patent: Jul. 28, 1998

[54] METHOD AND APPARATUS FOR REMOVING AIR LOCKS WITHIN MANUALLY OPERATED MICRO-FILTRATION DEVICES

[76] Inventor: Garth T. Webb, 18040 20th Avenue, White Rock, B.C., Canada, V4P 1M6

[21] Appl. No.: 640,929

[22] PCT Filed: Nov. 7, 1994

[86] PCT No.: PCT/CA94/00599

§ 371 Date: Jul. 26, 1996

§ 102(e) Date: Jul. 26, 1996

[87] PCT Pub. No.: WO95/12449

PCT Pub. Date: May 11, 1995

[30] Foreign Application Priority Data

Nov. 5, 1993 [CA] Canada .................................. 2102589

[51] Int. Cl.⁶ .......................... B01D 61/00; B01D 63/00; B01D 24/00
[52] U.S. Cl. .................. 210/650; 222/189.1; 222/189.9; 422/101; 210/321.75; 210/416.1; 210/416.3; 210/117; 210/475
[58] Field of Search .......... 210/321.72, 321.75, 210/416.1, 650, 117, 436, 453, 474, 475; 222/189.9, 189.1, 189.2–189.11; 422/101

[56] References Cited

U.S. PATENT DOCUMENTS

| 4,463,880 | 8/1984 | Kramer et al. .................. 222/420 |
| 4,533,068 | 8/1985 | Meierhoefer .................... 222/481 |
| 4,714,550 | 12/1987 | Malson et al. ................ 222/189.1 |
| 4,938,389 | 7/1990 | Rossi et al. .................. 210/321.64 |
| 4,940,542 | 7/1990 | Simizu et al. .................. 210/321.8 |
| 5,120,438 | 6/1992 | Nakagawa et al. ............. 222/189.1 |
| 5,130,015 | 7/1992 | Simizu et al. ................... 210/416.3 |

OTHER PUBLICATIONS

WO.A.92 04004 (Webb) 19 Mar. 1992.

*Primary Examiner*—Ana Fortuna
*Attorney, Agent, or Firm*—Oyen Wiggs Green & Mutala

[57] ABSTRACT

A method and apparatus for removing an air lock from the upstream side of a microfilter in a device for dispensing a sterile liquid from a storage container by forcing the liquid through a microfilter. The device include a first inlet passageway communicating between the storage container and a chamber on the upstream side of the filter closable by a valve, and a second passageway communicating between the storage container and the upstream side of the filter closable by a second valve, and the method includes the steps of a) creating partial vacuum in the chamber on the upstream side of the microfilter to thereby open the first valve and draw the liquid from the storage container through the first passageway into the chamber, and into the contact with the upstream side of the filter, b) closing the first and second valves and increasing the air pressure in the chamber, and c) opening the second valve thereby releasing air under pressure from the chamber through the second passageway.

6 Claims, 5 Drawing Sheets 5,785,858

METHOD AND APPARATUS FOR REMOVING AIR LOCKS WITHIN MANUALLY OPERATED MICRO-FILTRATION DEVICES

TECHNICAL FIELD

The invention relates to microfiltration devices which use hydrophillic membranes to sterilize liquids, and more particularly to a method and apparatus for removing air locks which develop on the upstream side of the filter membrane within these apparatus.

BACKGROUND ART

Microfiltration is a commonly used for sterilizing liquids and gases. See for example the present inventor's device disclosed in International application no. PCT/CA91/00056, published 19 Mar. 1992 under no. WO 92/04004. In that device, a liquid sterilizing microfilter is mounted on the outlet of a storage container to dispense sterile saline. A plunger is used to draw saline up from the container and force it through the microfilter, thereby sterilizing and dispensing the saline. A second micro-filter sterilizes the air which is drawn into the device to replace the ejected saline. Other prior art devices which employ hydrophillic membrane filters to sterilize liquids include those shown in applications no. GB 1,000,248; GB 2,106,877; and U.S. Pat. Nos. 4,938,389 and 4,533,068.

Within the microfiltration industry it is known that the integrity of a wetted microfilter membrane and its accompanying seals can be tested by pressurizing the upstream surface of the filter with air. The presence of air bubbles on the downstream side of the filter at relatively low air pressure indicates the presence of a leak either around the filter or through a defect within the membrane itself. The air pressure can be increased to a point where air is able to penetrate through the pores of the membrane. This is called the "bubble-point" test. It can be used to verify the pore size of the filter membrane, however, air-borne micro-organisms may also pass through the filter along with the air.

Once an integrity test has been conducted, the air on the upstream side of the filter remains trapped. This air could be pushed through the filter with liquid at pressures that exceed the "bubble point" pressure, but this may not be desirable for hand held filtering devices that are intended to deliver multiple unit doses of sterile liquid. The trapped air could also be removed from the upstream surface of the filter by inverting the entire device and allowing gravity to temporarily displace the air. This method may be valid but does entail certain technical disadvantages.

There is therefore a need for a mechanism that is capable of introducing and then removing air from the upstream surface of a hydrophillic filter membrane within a manually operated filtration device so that the operator may assure himself that the filter within the device if fully functional, without leaving an air lock on the filter.

DISCLOSURE OF INVENTION

The present invention provides a method and apparatus for removing an air lock from the upstream side of a microfilter in a device for dispensing a sterile liquid from a storage container by forcing the liquid through a microfilter, the device comprising a first inlet passageway communicating between the storage container and a chamber on the upstream side of the filter closable by a first valve, a second outlet passageway communicating between the storage container and the chamber on the upstream side of the filter closable by a second valve, the method comprising the steps of:

a) creating a partial vacuum in the chamber upstream of the microfilter to thereby open the first valve and draw the liquid from the storage container through the first passageway into the chamber and into contact with the upstream side of the filter;

b) closing the first and second valves and increasing the air pressure in the upstream chamber; and c) opening the second valve thereby releasing air under pressure from the upstream chamber through the second passageway.

BRIEF DESCRIPTION OF DRAWINGS

In drawings which illustrate a preferred embodiment of the invention;

FIG. 3 is a vertical cross-section of the device of FIG. 1 with the plunger pushed in;

BEST MODE(S) FOR CARRYING OUT THE INVENTION

Figure 1:
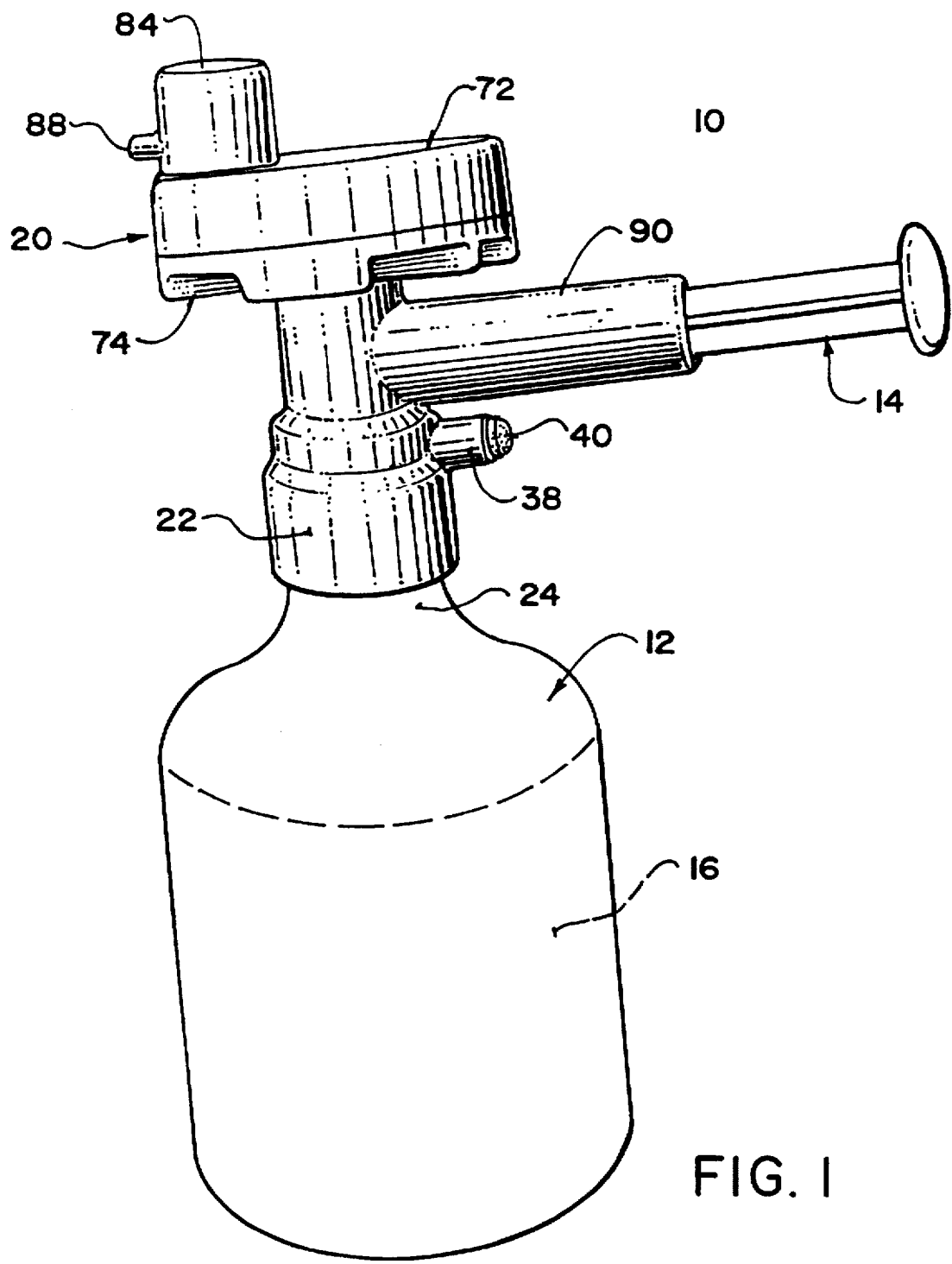
FIG. 1 is a perspective view of a device for dispensing sterile liquids.
Figure 2:
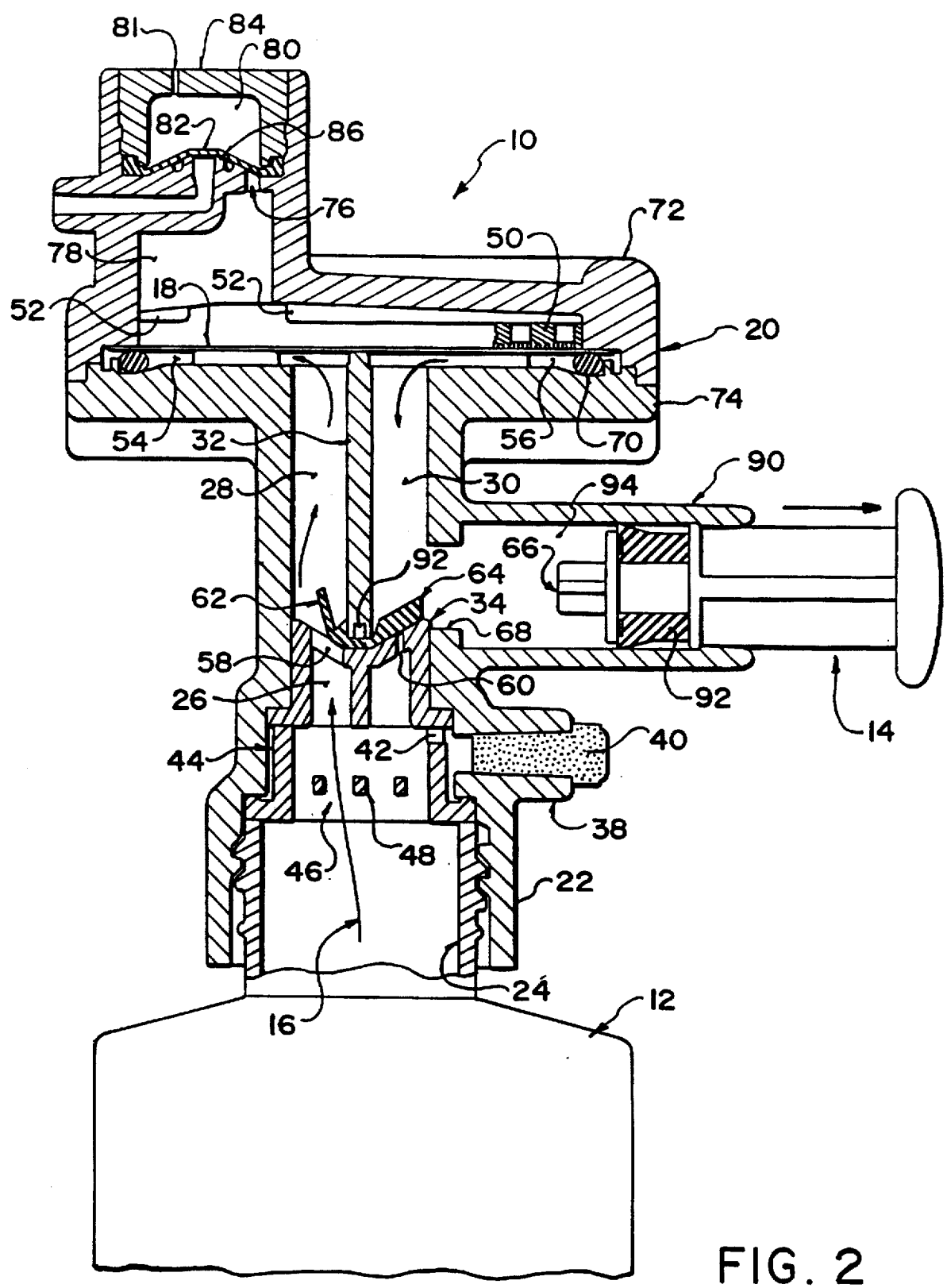
FIG. 2 is a vertical cross-section of the device of FIG. 1 with the plunger withdrawn.
Figure 3:
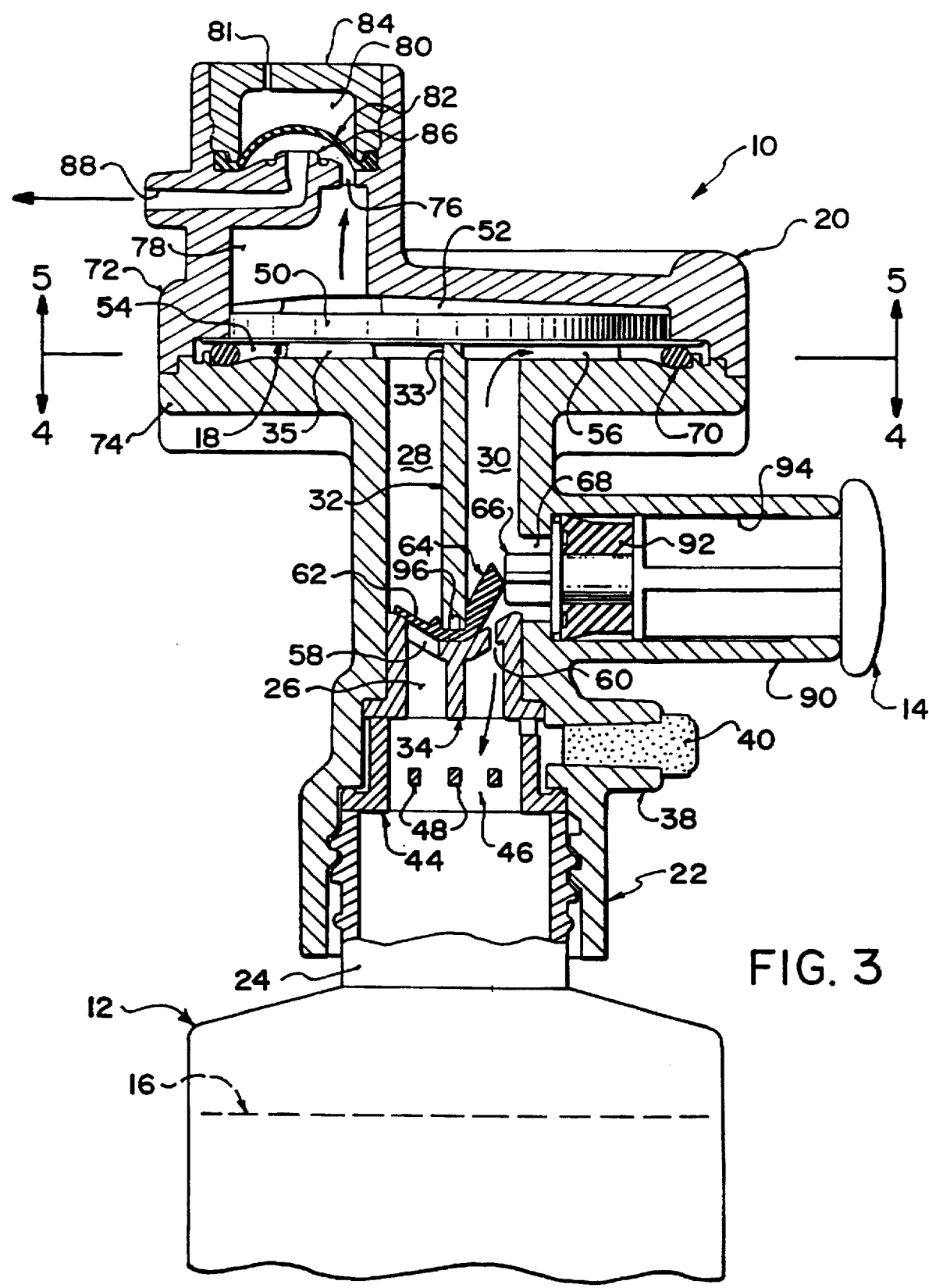

FIG. 1 illustrates the device according to the present invention consisting of filter unit 10 and a hollow storage container 12. A plunger 14 is used to provide pressure to the liquid saline 16 to force it through a sterilizing filter 18. The filter housing 20, constructed of a rigid polycarbonate plastic, has an internally threaded neck 22 which screws onto externally threaded neck 24 of container 12. Filter housing 20 has a central cylindrical chamber 26, the upper portion of which is divided into two semi-cylindrical chambers 28, 30 by a central wall 32. The lower end of chambers 28, 30 is closed by a flap valve support 34 which has three openings 58, 60.

The lower end of housing 20 has a circular aperture 38 which is covered by a hydrophobic filter 40 which thus permits air to travel through it, but not water or other liquids. Air passing through filter 40 is sterilized. A flap valve could also function in replacement of filter 40. Notch 42 on stopper support 44 permits air to enter bottle 12 from the exterior of the container while preventing liquid from escaping. Support 44 has a central circular opening 46 with cross-ribs 48.

Figure 4:
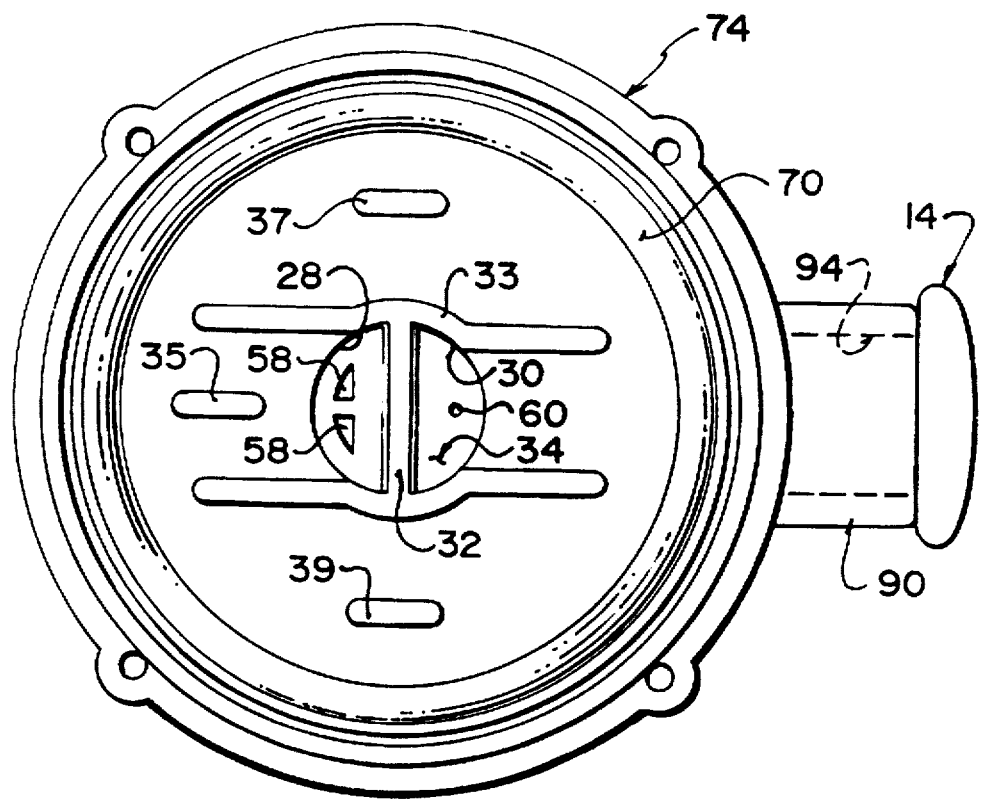
FIG. 4 is a top plan view taken along lines 4—4 of FIG. 3 with the flap valve removed.
Figure 5:
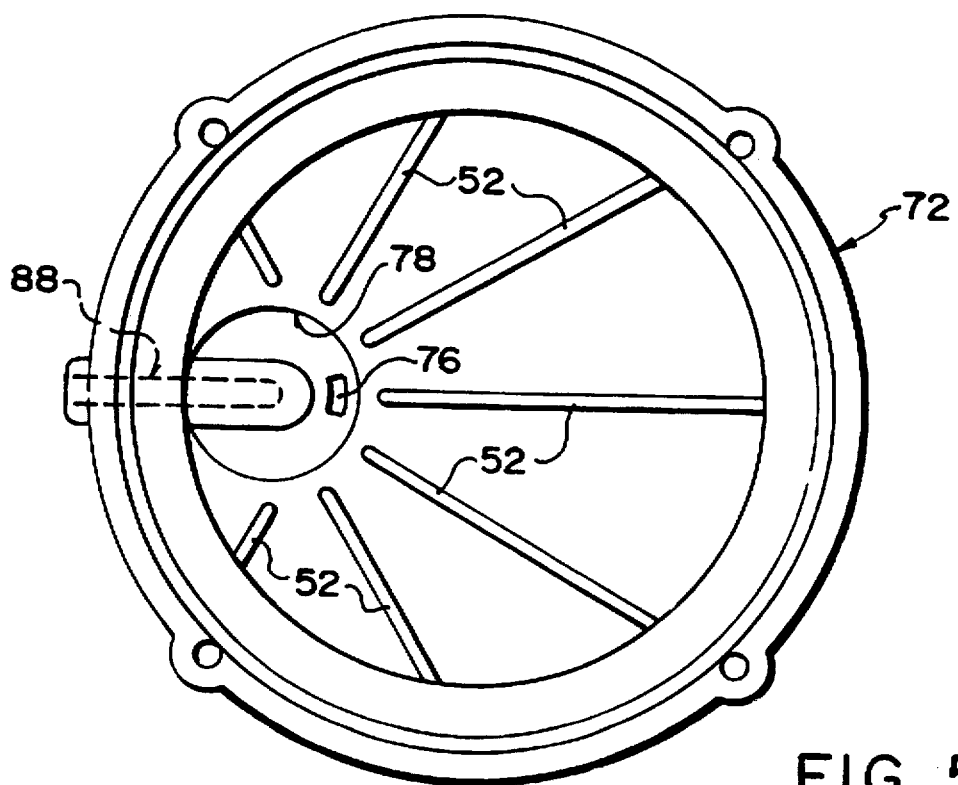
FIG. 5 is a bottom plan view taken along lines 5—5 of FIG. 3.

Semi-cylindrical chambers 28 and 30 are separated by vertical wall 32. Vertical wall 32 extends into barriers 33 (FIG. 4) leaving a passage around 33 for flow of liquid to occur along the upstream side of filter 18 from chamber 28 to 30 through chamber 54/56. Inserts 35, 37 and 39 provide support for the filter as well as spreading the liquid across the surface of the filter. Flap valve support 34 has three openings, two openings 58 extending from chamber 26 to chamber 28 and opening 60 extending from chamber 26 to chamber 30. Openings 58 are considerably greater in diameter than opening 60. Flap valve 62/64 is a unitary rubber flap consisting of two sections 62 and 64. Check valve 62 is a thin rubber flap valve with a thicker stop portion 63. Control valve 64 is similarly a rubber flap valve which is considerably thicker and therefore heavier than check valve 62. A protuberance 66 is provided at the end of piston 14 which extends through hole 68 to lift flap valve 64 at the end of the stroke of piston 14.

The upper end of chamber 54/56 is covered by hydrophillic filter 18. Filter 18 is held in place between upper filter unit housing section 72 and lower filter unit housing section 74 by filter support 50, which is a perforated plastic disk which sits in a cylindrical chamber formed between upper filter unit housing section 72 or and lower filter unit housing section 74, with a chamber 78 formed between filter support 50 and upper filter unit housing 72 and chamber 54/56 formed between filter support 50 and lower filter unit housing 74. Filter support 50 preferably has an array of large holes on its upper surface and a series of concentric ridges on its lower surface to provide uniform support to the filter. O-ring 70 seals the junction between upper and lower sections 72, 74. In this way liquid flowing up passageways 28 or 30 is forced through filter 18 rather than going around its edges. Ribs 52 hold filter support 50 in place and direct the flow of liquid to chamber 78. Passage 76 runs from chamber 78 to circular chamber 80 which is covered by a circular rubber membrane or diaphragm 82. Diaphragm 82 is secured at its outer edge by clamp piece 84 and is stretched across central cylindrical extension 86 through the centre of which runs passage 88 to the exterior of the housing. A vent 81 facilitates the movement of diaphragm 82.

Plunger 14 extends into hollow cylinder 90. Plunger 14 has attached at one end thereof a flexible silicone piston 92 which sealingly slides in cylinder 90. Passageway 68 extends from chamber 94 within cylinder 90 to chamber 30.

In operation, the integrity of the filter 18 is tested by determining whether any air is expelled from passageway 88 when the device is operated to force air against the upstream side of filter 18. If air is expelled in addition to the liquid, then there is a problem with the integrity of the filter. By testing the device in this way an air lock may be formed on the upstream side of filter 18, blocking the passage of liquid through filter 18. The air lock is removed by passing liquid under increased pressure across the lower surface of filter 18 and driving the air back into container 12. For example, withdrawal of plunger 14 creates a vacuum within chambers 28 and 30. The greater air pressure in container 12 than in chamber 28 therefore causes saline 16 to pass through chamber 26, through openings 62 and into chamber 28 around check valve 107, filling chamber 28 and passing into chamber 54. Flap valve 64 is not unseated due to its weight and the small size of aperture 60. The liquid flows from chamber 28 then around ridges 33 thereby spreading out across the upstream face of filter 18 thereby carrying air with it and down into chamber 30. Plunger 14 is then pressed inwardly to force check and control valves 62 and 64 against support 34, closing apertures 58, 60. Air remaining in chamber 30 is compressed. As plunger 14 reaches the end of its stroke, air pressure within chamber 30 is greatly increased until protuberance 66 lifts valve 64, allowing the pressurized air to squirt back to container 12. At the same time liquid flows out of chambers 28 and 30 into chambers 54, 56 thus replacing the air which had locked filter 18. Further pressure will then force saline through filter 18 opening diaphragm 82 and passageway 88 permitting the sterilized saline to be dispensed out of passageway 88. Filter 40 permits sterilized air to enter the bottle 12 through notch 42 to replace the ejected saline.

The present invention thus provides a device for removing air locks from a micro-filtration device that is attachable to a liquid storage container. The interior space is defined by the upstream surface of the filter 18 and the filter housing 72/74. The apparatus consists of three components that are in communication with the defined interior space. The first component is the inlet passage 26/28 with accompanying flap valve 62. This inlet passage allows a one-way flow of liquid and air from the attached storage container 12. The storage container, as described above, may be vented to allow ambient air to replace the liquid that is extracted from it.

The second component is plunger 14 that is fluid-tightly mounted within hollow cylinder 130. Preferably, the walls of cylinder 90 are an integral part of the filter housing. A collapsible accordion-like container could be substituted for the plunger arrangement.

The third component is outlet passage 60/26 and an related control valve 64. This outlet passage leads liquid and air through a conduit back into the storage container. Such a conduit could be integrated within the filter housing so that it could be attached simultaneously with the filter housing to the storage container. The control valve 64 could be actuated either internally by the movement of the piston (protuberance 66), or externally by manual control.

The function of the plunger 14 is firstly to create a partial vacuum within the defined interior space. This is done by pulling the piston outwardly to increase the volume of the defined interior space. This partial vacuum draws liquid from the storage container 12 into the defined interior space, whether using a feed tube or by tilting the unit. The plunger 14 is then pushed inwardly, creating a positive pressure which acts to close the flap valve 62. Liquid will flow through the filter membrane 18 whereas air will not. Air trapped within the defined interior space will then be compressed by the positive pressure. The compressed air can be released only when the control valve 64 is opened. The control valve 64 may be opened by either an internally mounted mechanism attached to the piston, or by an externally mounted mechanism. Regardless of the type of mechanism used to open the control valve 64, once opened, the compressed air expands and exits out the outlet passage which would preferably lead back into the storage container, although it may exit to the exterior of the device.

Figure 6:
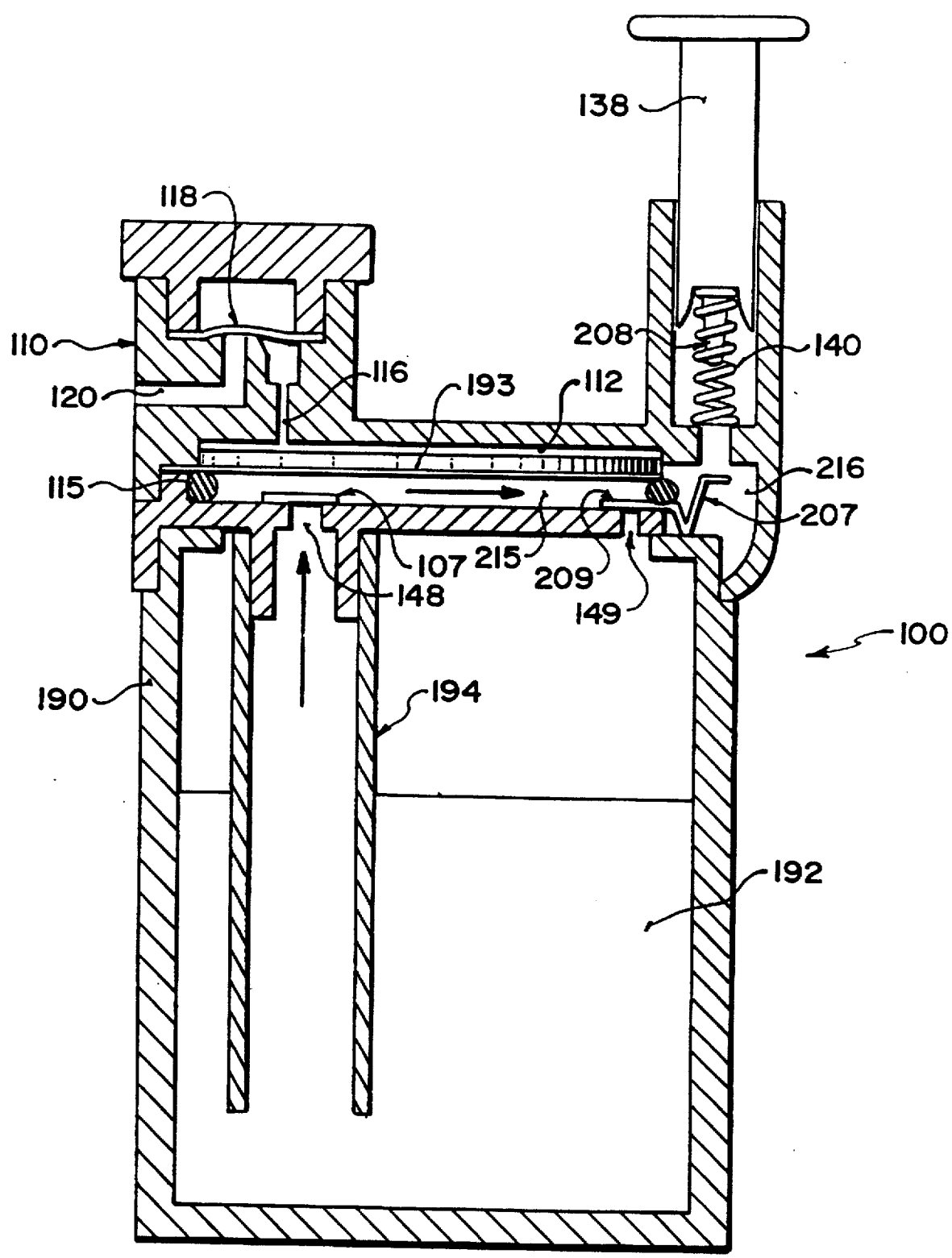
FIG. 6 is a vertical cross-section of a second embodiment of the invention.

A second embodiment of the device 100 is shown in FIG. 6. In this embodiment chamber 28 is collapsed to negligible height. The piston 138 applies pressure to chamber 216 which communicates with chamber 215. Protuberance 208 presses down on control arm 207 to lift one end of the valve 209 and open channel 149 at the end of the piston's stroke. A feed tube 194 is provided in this embodiment (the first embodiment would require tilting of the bottle to supply liquid to chamber 26). O-ring 115, filter support 193 (the filter is not shown), chamber 112, passage 116, valve 118 and passage 120 in upper housing 110 function as in the previous embodiment. Flap valve 107 operates to open and close passage 148 to permit the flow of saline 192.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of removing an air lock from the upstream side of a microfilter in a device for dispensing a sterile liquid from a storage container by forcing said liquid through a microfilter, said device comprising a first inlet passageway communicating between said storage container and a chamber on the upstream side of said filter closable by a first valve, a second outlet passageway communicating between said storage container and said chamber on the upstream side of said filter closable by a second valve, said method comprising the steps of:

a) creating a partial vacuum in said chamber upstream of said microfilter to thereby open said first valve and draw said liquid from said storage container through said first passageway into said chamber and into contact with the upstream side of said filter;

b) closing said first and second valves and increasing the air pressure in said upstream chamber; and c) opening said second valve thereby releasing air under pressure from said upstream chamber through said second passageway.

2. The method of claim 1 wherein said air under pressure is released into said storage container.

3. The method of claim 2 wherein said pressure in said chamber is increased by a plunger and said valve on said outlet passage is opened by contact with said plunger.

4. A device for storing and dispensing a sterile liquid comprising a hollow storage container for storing said liquid, said hollow storage container having an outlet, a housing mounted on said hollow storage container having an intermediate chamber comprising a first and a second chamber, and a first and a second passageway communicating between said hollow storage container and said first and second chambers respectively, and a filtrate outlet passageway communicating between said intermediate chamber and the exterior of said housing, a liquid-sterilizing filter having an upstream and a downstream face mounted in said housing between said filtrate outlet passageway and said intermediate chamber, wherein said first and second chambers communicate by means of a passage across said upstream face of said liquid-sterilizing filter, means for increasing and reducing pressure in the interior of said intermediate chamber, whereby said liquid is drawn into said intermediate chamber from said hollow storage container when pressure is reduced therein, and when pressure is increased in the interior of said intermediate chamber liquid held in said intermediate chamber is forced out said filtrate outlet passageway, said housing further comprising a check valve associated with said first passageway between said hollow storage container and said first chamber, adapted to permit said liquid to flow into said first chamber from said hollow storage container when the pressure in said intermediate chamber is reduced, and prevent the flow of said liquid from said intermediate chamber into said hollow storage container when the pressure in said intermediate chamber is increased, a control valve associated with said second passageway between said hollow storage container and said intermediate chamber, adapted to selectively permit said liquid to flow out of said intermediate chamber into said hollow storage container and prevent the flow of said liquid from said intermediate chamber into said hollow storage container, and means for opening said control valve, and wherein the cross-sectional area of said first passageway is great compared to the cross-sectional area of said second passageway.

5. The device of claim 4 wherein said means for increasing and reducing pressure in the interior of said intermediate chamber comprises a piston movable within a cylinder, said cylinder having an open end communicating with said interior of said second chamber.

6. The device of claim 5 wherein said means for opening said control valve comprises means connected to said piston.

* * * * *